Jan. 9, 1940. J. MIHALYI 2,186,613
PHOTOGRAPHIC CAMERA
Filed Dec. 22, 1937
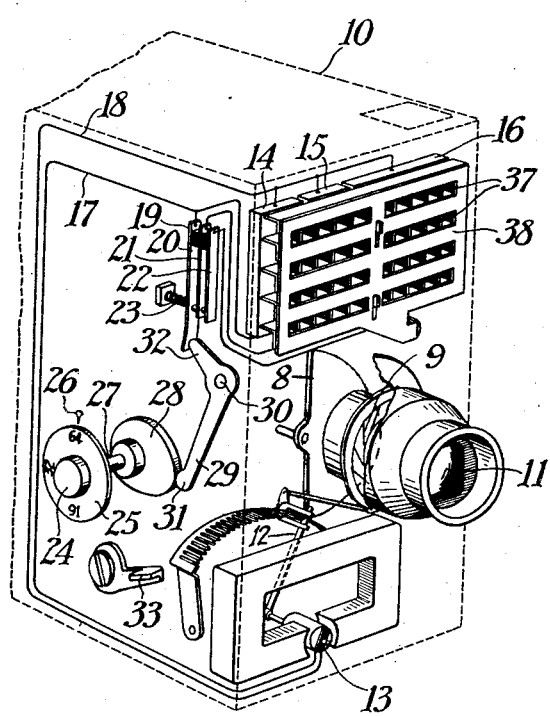
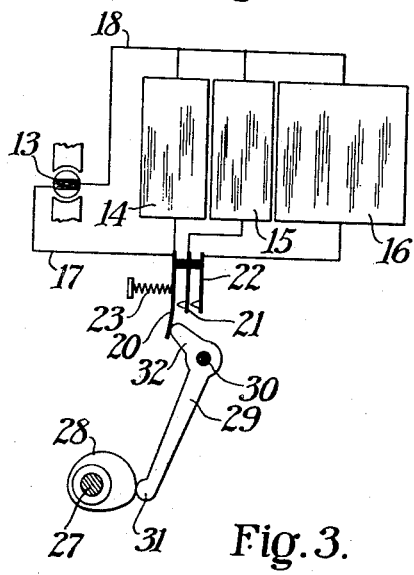
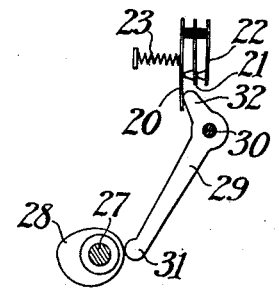
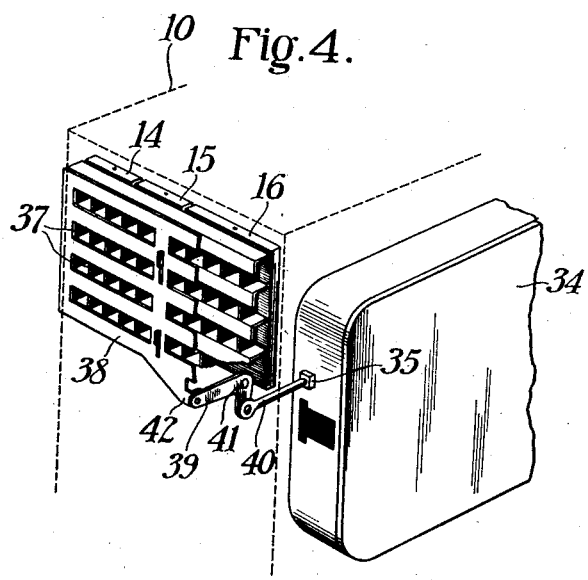
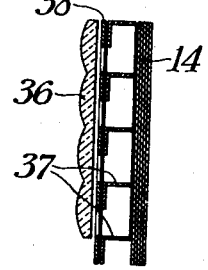
Joseph Mihalyi
INVENTOR
BY
ATTORNEYS Patented Jan. 9, 1940

2,186,613

UNITED STATES PATENT OFFICE 2,186,613

PHOTOGRAPHIC CAMERA

Joseph Mihalyi, Rochester, N. Y., assignor to Eastman Kodak Company, Rochester, N. Y., a corporation of New Jersey Application December 22, 1937, Serial No. 181,179

2 Claims. (Cl. 95—64)

My present invention relates to photographic cameras, and, particularly, to a camera provided with a light sensitive device for determining or controlling the setting of its exposure control devices in accordance with the light conditions prevailing when an exposure is to be made.

In cameras of this type it is known to employ a photoelectric cell for actuating a meter member, the pointer of which determines the setting of the exposure device of the camera in accordance with the activation of the cell. It is also known to alter the activation of the cell in accordance with the setting of one or more of the exposure control devices or in accordance with the sensitivity of the photographic layer to be exposed.

It is an object of the present invention to provide an improved photoelectric exposure meter, the characteristics of which are adapted to be altered so that it is easily adjustable to correspond to different conditions.

Another object of my invention is to provide a plurality of cell units which may selectively be included in the meter circuit for any predetermined purpose.

A further object of my invention is to provide a photographic camera in which one of the exposure control devices is controlled by an electric meter energized by one or more cell units in accordance with the setting of the other exposure control devices.

A further object of my invention is to provide a camera of this type with an arrangement whereby the amount of light falling on the cell is automatically altered in accordance with the sensitivity of the film when the film container is placed in the camera.

Other objects and advantages of my invention will apear from the following description when taken in connection with the accompanying drawing and its scope will be pointed out in the appended claims.

Fig. 1 is a view in perspective and partly in outline of the front portion of a motion picture camera to which my invention may be applied;

Fig. 2 shows diagrammatically the switching arrangement under the control of the shutter speed setting device for selectively including in the meter circuit one or more electrically separated cell units;

Fig. 3 illustrates a detail of the switching arrangement in the position at which all of the cell units are included in the circuit;

Fig. 4 is a perspective view partially in section of an arrangement for adjusting the amount of light falling on the cell units in accordance with the sensitivity of the film to be employed; and Fig. 5 is a side elevation in section of a cell unit and its accompanying light regulating structure.

In the interests of clarity I have shown in the drawing only those parts of a camera apparatus necessary to illustrate the manner in which my invention may be applied thereto.

For the purposes of illustration I have shown one form of my invention as embodied in a motion picture camera having a casing 10 shown in outline provided with the usual objective 11, the diaphragm 9 of which is adapted to be controlled in accordance with the position of a pointer 12 carried by a meter coil 13 as is fully described and claimed in my Patent No. 2,058,483 which issued October 27, 1936, and need not be here described in detail. The meter coil 13 is connected in circuit with a light-sensitive cell 14 carried on the front of the camera casing 10. The cell 14 comprises one unit of the complete cell unit which also includes additional cell units 15 and 16. The cell unit 14 is preferably permanently connected to the meter coil 13 by leads 17 and 18 and the units 15 and 16 are selectively connected in parallel with the unit 14 by means of a multiple position switch 19 which may take any suitable form and is here shown as comprising three contact bars 20, 21, and 22, which may be biased by their own resilience or by means of a compression spring 23 to a position at which all three of the bars 20, 21, and 22 are in contact thereby connecting all three cell units 14, 15, and 16 in circuit with the meter coil 13.

It will be understood that the number of cell units employed will depend upon the requirements of the apparatus to which they are applied, and in the motion picture camera of the present embodiment three units are used because the camera is provided with three different shutter speeds which are indicated as being 16, 32, and 64 frames per second.

The camera 10 to which the arrangement of my invention is applied has a suitable shutter 8 and is provided with any suitable mechanism for adjusting the speed at which the shutter will be operated. For the purpose of illustration, I have shown a control knob 24 provided with a scale 25 which cooperates with an index mark 26 carried by the camera casing 10 to indicate the setting of the shutter speed mechanism. This knob 24 is preferably mounted on a suitable shaft 27 which, in addition to the speed controlling member (not shown), is provided with a cam 28 which functions to control the switch 19 by means of a bell crank 29 which is pivoted at 30 and has the end 31 of one of its arms engaging the cam 28 and has its other arm 32 abutting against the switch bar 20 in a direction to overcome the bias of the spring 23. In this manner the bias afforded by the spring 23 at all times urges the cam following end 31 into engagement with the cam 28.

As shown in Figs. 1 and 2 the camera is set for a shutter speed of 64 frames a second and the cam 28 is in a position which holds the three switch bars 20, 21, and 22 out of engagement, whereby only the cell unit 14 is in circuit with the meter coil 13. If the speed adjusting knob 24 is rotated to set the camera for 32 frames a second, the cam 28 permits rotation of the bell crank 29 about its pivot 30 to a position at which the spring 23 moves the switch bar 20 into engagement with the switch bar 21 so as to include the cell unit 15 in circuit with the meter coil 13. It will be evident that if the cell units 14 and 15 are of equal size, this adjustment which doubles the time of the camera exposure also doubles the effective area of the cell being used which naturally results in a greater deflection of the meter pointer 12, thereby setting the diaphragm 9 of the camera at a much smaller aperture when the camera is actuated as by pressing a release lever 33 as is fully explained in my above identified patent. If the shutter speed of the camera is adjusted to 16 frames a second the exposure interval will again be doubled and, under the same lighting conditions, the effective aperture of the diaphragm should be reduced by one half. This is accomplished by again doubling the effective area of the cell by connecting in the meter circuit the cell unit 16 which for this purpose has an area equal to the combined areas of the units 14 and 15. For the camera setting of 16 frames a second the cam 28, the bell crank 29 and the switch bars 20, 21 and 22 will be in the position shown in Fig. 3 at which all three cell units 14, 15, and 16 are included in the meter circuit.

It is frequently desirable to alter the operating characteristics of the exposure control arrangement in accordance with the sensitivity of the film to be exposed and for this purpose I have shown in Fig. 4 an arrangement whereby the amount of light falling on the cell units 14, 15, and 16 is automatically adjusted in accordance with the sensitivity of the film when its container, which may be a magazine 34, is inserted in the camera. The magazine 34 is provided with an embossing 35 characteristic of the sensitivity of the film contained in the magazine 34 and the character of this embossing 35 correspondingly alters the light falling on the cell units 14, 15, and 16 in any suitable manner. One suitable arrangement for this purpose is shown in Figs. 4 and 5 as comprising a baffle arrangement including a plurality of lenses 36 spaced in front of the cell units 14, 15, and 16 by a distance substantially equal to their focal length, and behind each of the lenses 36 is provided a baffle chamber defined by intersecting strips 37 which cooperate with the lenses 36 to restrict the cone angle of light falling on the cell 14. Since the cell is substantially in the focal plane of the lenses 36, the intensity of the light falling on the cell may be altered by varying the effective apertures of the lenses 36 and this is accomplished by means of a movable grid member 38 positioned immediately behind the lenses 36 which is near enough to their diaphragm plane to perform the function of varying the amount of light reaching the cell 14 without altering its distribution. This particular arrangement for varying the exposure of the cell is described and claimed in my copending application, Serial No. 176,826, filed November 27, 1937.

One suitable arrangement for performing this diaphragming action in accordance with the sensitivity of the film to be employed in the camera is illustrated in Fig. 4 as comprising a mechanical linkage including a bell crank 39 and a connecting rod 40, the bell crank 39 is pivoted at 41 and connected to a depending ear 42 provided on the grid 38. The connecting rod 40 is adapted to bear against the embossing 35 carried by the magazine 34 and depending upon the size or character of the embossing 35, the bell crank 39 is rotated about its pivot 41 which results in a corresponding vertical adjustment of the grid 38, which, as explained above, varies the effective apertures of the lenses 36 to increase or decrease, as the case may be, the light falling on the cell units 14, 15, and 16.

While, for the purposes of illustrating my invention, I have described it as embodied in a motion picture camera in which the cell controlled meter controls the setting of the camera diaphragm, it will be understood by those skilled in the art that many other similar arrangements are readily available, and that the invention contemplates and includes any arrangement in which one of the exposure controlling devices of a camera is so arranged that the adjustment of its setting selects a number of cell units which are included in the meter circuit. The specific structure and arrangement of parts as described are merely illustrative of my invention and other modifications and arrangements for performing similar functions will occur to those skilled in the art without departing from the spirit and scope of my invention as set forth in the appended claims.

Having thus described my invention, what I declare is new and desire to secure by Letters Patent of the United States is:

1. In a photographic camera in which a device including an electrical meter determines the opening to which the diaphragm of the camera is to be adjusted, a circuit for said meter, a plurality of light sensitive cells, means for selectively connecting in the circuit any number of said cells, a shutter, a member movable for altering the speed setting of the shutter, and means actuated by the movement of said shutter setting member for controlling said connecting means, whereby the number of cells connected in the meter circuit depends upon the shutter speed setting.

2. A photographic camera having a member movable for altering the setting of an exposure device of the camera, an exposure meter on the camera comprising a dry type photovoltaic cell divided into two electrically independent parts, an electrical measuring instrument, a circuit connecting said instrument to one of the said parts of the cell, switching means for inserting the other part of the cell in said circuit, whereby said instrument may be connected to the output of one or both parts of the cell, and means controlled by the movement of said member for actuating said switching means.

JOSEPH MIHALYI.